(12) United States Patent
Kuroda et al.

(10) Patent No.: US 8,178,074 B2
(45) Date of Patent: May 15, 2012

(54) METHOD FOR PRODUCING TITANIUM OXIDE PARTICLES

(75) Inventors: Yasushi Kuroda, Toyama (JP); Noriyuki Sugishita, Toyama (JP); Bunsho Ohtani, Sapporo (JP)

(73) Assignees: Showa Denko K.K., Tokyo (JP); National University Corporation Hokkaido University, Hokkaido (JP)

( * ) Notice: Subject to any disclaimer, the term of this patent is extended or adjusted under 35 U.S.C. 154(b) by 24 days.

(21) Appl. No.: 12/738,251

(22) PCT Filed: Aug. 29, 2008

(86) PCT No.: PCT/JP2008/065565
§ 371 (c)(1),
(2), (4) Date: Apr. 15, 2010

(87) PCT Pub. No.: WO2010/023757
PCT Pub. Date: Mar. 4, 2010

(65) Prior Publication Data
US 2010/0209334 A1    Aug. 19, 2010

(51) Int. Cl.
*C01G 23/047*    (2006.01)
(52) U.S. Cl. ........................ 423/613; 977/776
(58) Field of Classification Search .......... 423/608–613; 977/773, 775, 776
See application file for complete search history.

(56) References Cited

U.S. PATENT DOCUMENTS

| | | | |
|---|---|---|---|
| 6,835,455 B2 | 12/2004 | Tanaka et al. | |
| 2002/0131929 A1* | 9/2002 | Tanaka et al. | 423/610 |
| 2003/0082099 A1* | 5/2003 | Tanaka et al. | 423/613 |
| 2005/0076811 A1* | 4/2005 | Kayama et al. | 106/437 |
| 2005/0113506 A1* | 5/2005 | Tanaka et al. | 524/497 |
| 2005/0271578 A1 | 12/2005 | Terada et al. | |
| 2006/0074173 A1* | 4/2006 | Kogoi et al. | 524/497 |
| 2006/0251573 A1* | 11/2006 | Musick et al. | 423/613 |
| 2007/0081938 A1* | 4/2007 | Sakai | 423/610 |
| 2007/0154384 A1* | 7/2007 | Musick et al. | 423/613 |
| 2007/0172414 A1* | 7/2007 | Subramanian et al. | 423/613 |
| 2007/0205389 A1 | 9/2007 | Kurozumi et al. | |

FOREIGN PATENT DOCUMENTS

| | | |
|---|---|---|
| EP | 1 243 555 A1 | 9/2002 |
| JP | 3656355 A | 3/2005 |
| JP | 2005-306728 A | 11/2005 |

(Continued)

OTHER PUBLICATIONS

Kusano, et al., "Preparation of titanium oxide photocatalyst fine particles having high activity by gas-phase oxidation method using titanium chloride (IV))", 98th Catalyst Discussion Session (September, H18), Discussion Session Proceedings A, p. 234, 2006.
Korean Office Action issued in Korean Patent Application No. 10-2010-7009437 dated Sep. 23, 2011.
Japanese Notice of Allowance mailed Mar. 27, 2012 for corresponding Japanese Application No. 2007-154016.

(Continued)

*Primary Examiner* — Stanley Silverman
*Assistant Examiner* — Anthony J Zimmer
(74) *Attorney, Agent, or Firm* — Sughrue Mion, PLLC

(57) ABSTRACT

Titanium oxide particles having a particle having a decahedral box-shape and a particle size in a range of from 1 nm to 100 nm can be selectively and efficiently produced by carrying out a method in which in a case of oxidizing titanium tetrachloride in vapor at high temperatures, it is rapidly heated and cooled, and a method, in which water vapor is used as an oxidizing gas, in combination under certain conditions.

9 Claims, 1 Drawing Sheet

FOREIGN PATENT DOCUMENTS

| | | |
|---|---|---|
| JP | 2006-052099 A | 2/2006 |
| JP | 2011-148697 | 8/2011 |
| KR | 1020020037041 A | 5/2002 |
| WO | WO 01/81245 A1 | 11/2001 |
| WO | 03/074426 A1 | 9/2003 |
| WO | 2004/063431 A1 | 7/2004 |
| WO | WO 2006098175 A1 * | 9/2006 |

OTHER PUBLICATIONS

Yoshihiro Terada et al., "Synthesis of Decahedral-shaped Titania Crystallites by Vapor Phase Reaction and Their Photocatalytic Properties" Draft for the lecture of the Chemical Society of Japan, vol. 84, 1, p. 484, (2004).

* cited by examiner

METHOD FOR PRODUCING TITANIUM OXIDE PARTICLES

TECHNICAL FIELD

The present invention relates to a method for producing titanium oxide particles having a decahedral box-shape.

BACKGROUND ART

Recently, decahedral titanium oxide particles containing mainly anatase-type crystals (below, abbreviated as "decahedral titanium oxide particles") and a production method therefor have been reported (Patent Documents Nos. 1 and 2, and Non-Patent Document No. 1). In addition, it is also reported in these documents that the decahedral titanium oxide particles have high activity as a photocatalyst.

The production method for the decahedral titanium oxide particles reported in these documents is a method in which a gas containing titanium tetrachloride and oxygen is rapidly heated and then rapidly cooled under certain conditions. However, the decahedral titanium oxide particles obtained by the production method have almost a particle diameter of 100 nm or greater. Therefore, it is difficult to selectively obtain decahedral titanium oxide particles having a particle diameter of 100 nm or less by these conventional production methods. There is a problem to be solved in which the particle size is decreased while maintaining a decahedral box-shape.

At the same time, as a method for producing fine titanium oxide particles, a method, in which oxygen and water vapor are used as an oxidizing gas when titanium tetrachloride is oxidized in vapor, has been suggested (Patent Document No. 3).

Patent Document No. 1: PCT International Publication No. WO 04/063431 brochure Patent Document No. 2: Japanese Unexamined Patent Application, First Publication No. 2006-52099

Patent Document No. 3: Japanese Patent Publication No. 3656355

Non-Patent Document No. 1: Kusano•Terada•Abe•Ohtani, 98th Catalyst Discussion Session (September, H18), Discussion Session Proceedings A, page 234

DISCLOSURE OF THE INVENTION

Problems to be Solved by the Invention

The present invention is suggested based on these conventional circumstances. One object of the present invention is to provide a method for producing titanium oxide particles which can produce efficiently and selectively the decahedral titanium oxide having a small particle diameter.

Means for Solving the Problem

As a result of conducting diligent research to achieve the object, the inventors of the present invention have found that when a method of oxidizing titanium tetrachloride in vapor at high temperatures, and it is rapidly heated and cooled, and a method in which water vapor is used as an oxidizing gas are used in combination at certain conditions, decahedral titanium oxide particles having a particle diameter of 100 nm or less can be obtained selectively.

In other words, the present invention provides the following methods for producing titanium oxide particles.

[1] A method for producing titanium oxide particles having a decahedral box-shape, and a particle diameter in a range of from 1 nm to 100 nm, by contacting a gas containing titanium tetrachloride vapor and an oxidizing gas containing water vapor, which produces selectively the titanium oxide particles, wherein the method comprises a step of mixing the gas containing titanium tetrachloride vapor and the oxidizing gas containing water vapor, which are heated to 500° C. or greater, and introducing the mixed gas into a region which is heated to 800° C. or greater.

[2] A method for producing titanium oxide particles according to [1], wherein the gas containing titanium tetrachloride vapor contains titanium tetrachloride vapor, and oxygen.

[3] A method for producing titanium oxide particles according to [1] or [2], wherein the oxidizing gas containing water vapor is a mixed gas of water vapor and oxygen.

[4] A method for producing titanium oxide particles according to any one of [1] to [3], wherein a residence time of the mixed gas in the region which is heated to 800° C. or greater is 300 msec. or less.

[5] A method for producing titanium oxide particles according to [4], wherein the residence time is 100 msec. or less.

[6] A method for producing titanium oxide particles according to any one of [1] to [5], wherein a concentration of the titanium tetrachloride in the gas containing titanium tetrachloride vapor is in a range of from 3 to 40% by volume.

[7] A method for producing titanium oxide particles according to any one of [1] to [6], wherein a molar ratio (moles [mol] of oxygen ($O_2$ unit conversion)/moles [mol] of titanium tetrachloride) in the gas containing titanium tetrachloride vapor is in a range of from 0.1 to 7.

[8] A method for producing titanium oxide particles according to any one of [1] to [7], wherein a concentration of the water vapor in the oxidizing gas containing water vapor is in a range of from 10 to 80% by volume.

[9] A method for producing titanium oxide particles according to any one of [1] to [8], wherein a molar ratio (moles [mol] of oxygen ($O_2$ unit conversion)/moles [mol] of water vapor) in the oxidizing gas containing water vapor is in a range of from 0.1 to 5.

[10] A method for producing titanium oxide particles according to any one of [1] to [9], wherein a volume ratio of the oxidizing gas containing water vapor relative to the gas containing titanium tetrachloride vapor is in a range of from 0.5 to 5 times.

[11] A method for producing titanium oxide particles according to any one of [1] to [10], wherein a composition (a volume ratio of titanium tetrachloride:oxygen:water vapor) of a mixed gas of the gas containing titanium tetrachloride vapor and the oxidizing gas containing water vapor is 1:0.5 to 13:0.3 to 5.

[12] A method for producing titanium oxide particles according to [11], wherein a composition (a volume ratio of titanium tetrachloride:oxygen:water vapor) in a mixed gas of the gas containing titanium tetrachloride vapor and the oxidizing gas containing water vapor is 1:1 to 6:0.3 to 3.

Effects of the Present Invention

As explained above, in the method for producing titanium oxide particles according to the present invention, a method of oxidizing titanium tetrachloride in vapor at high temperatures, and it is rapidly heated and cooled, and a method in which water vapor is used as an oxidizing gas are used in combination under certain conditions. It is possible to produce selectively and efficiently the decahedral titanium oxide particles having a particle size in a range of from 1 nm to 100 nm. In addition, the obtained fine titanium oxide particles are useful for a photocatalyst material. Therefore, according to the present invention, it is possible to produce industrially the decahedral titanium oxide particles which are useful for a photocatalyst material.

EXPLANATION OF REFERENCE SYMBOLS

Figure 1:
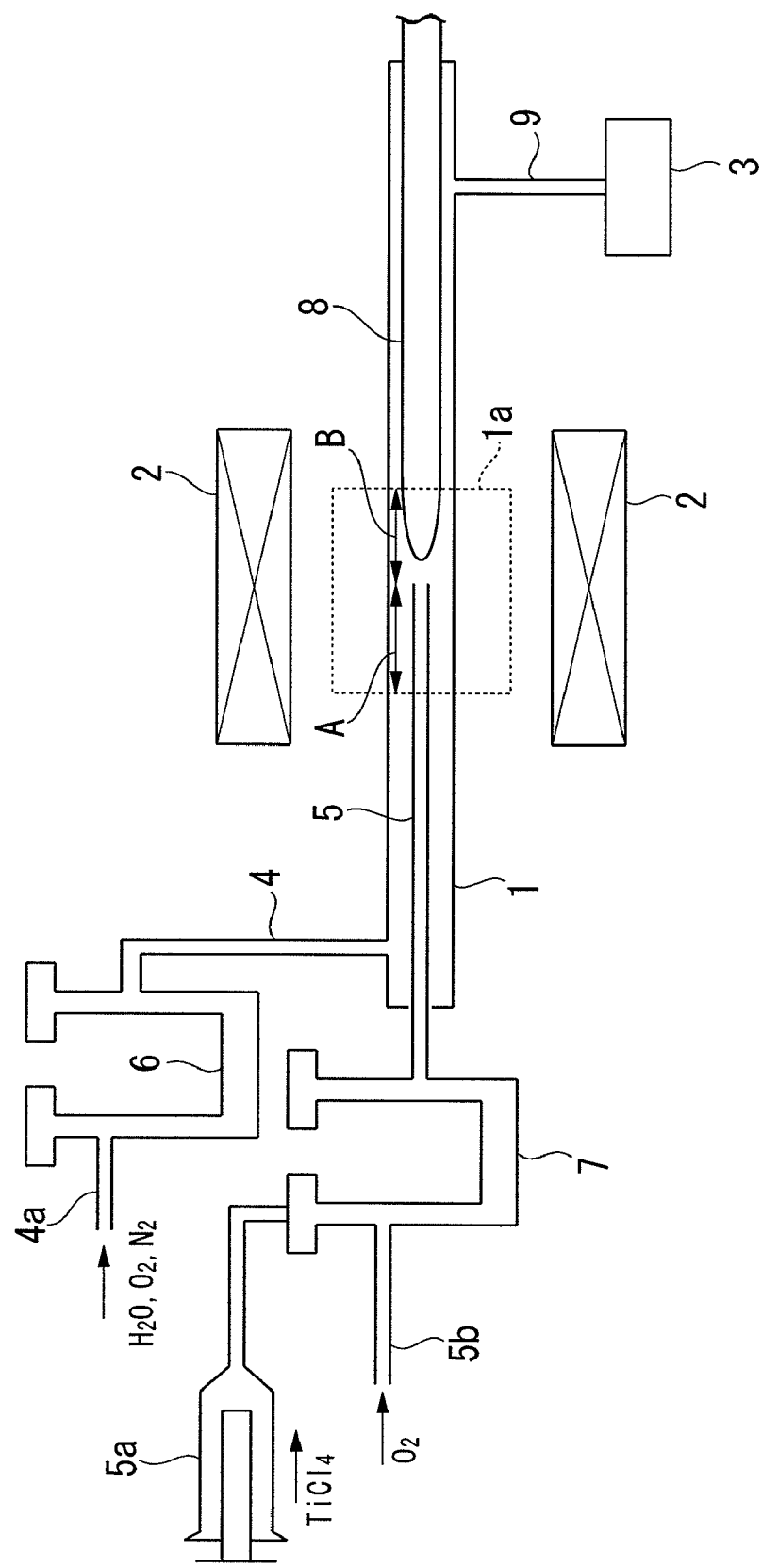
FIG. 1 is a block diagram showing one embodiment of a reaction apparatus for carrying out the method for producing titanium oxide particles according to the present invention.

| 1 | reaction tube | 1a | heated portion |
|---|---|---|---|
| 2 | infrared gold image furnace | 3 | product material recovery portion |
| 4 and 5 | introduction tube | 6 and 7 | vaporizer |
| 8 | baffle | 9 | outlet tube |

BEST MODE FOR CARRYING OUT THE INVENTION

The method for producing titanium oxide particles according to the present invention is explained in detail below, referring to FIG. 1.

The method for producing titanium oxide particles according to the present invention is a method for producing titanium oxide particles, which have a decahedral box-shape, and a particle diameter in a range of from 1 nm to 100 nm, by contacting a gas containing titanium tetrachloride vapor and an oxidizing gas containing water vapor, which produces selectively the titanium oxide particles, wherein the method comprises a step of mixing the gas containing titanium tetrachloride vapor and the oxidizing gas containing water vapor, which are heated to 500° C. or greater, and introducing the mixed gas into a region which is heated to 800° C. or greater.

Specifically, "decahedral titanium oxide particles" in the present invention means titanium oxide particles having a decahedral box-shape, which are similar to titanium oxide particles defined in Patent Document No. 1.

In addition, "the decahedral titanium oxide particles are produced selectively" means that when the produced titanium oxide particles are randomly collected, and observed using an electronic microscope, at least 80% of titanium oxide particles, which can be observed in an arbitrary visual field, have the particle diameter of from 1 nm to 100 nm.

In the present invention, "an oxidizing gas containing water vapor" means a gas which can produce titanium oxide when the gas contacts the titanium tetrachloride vapor at high temperatures.

In the present invention, the oxidizing gas containing water vapor is preferably a gas containing at least two components of oxygen and water vapor. Examples of the oxidizing gas containing water vapor include a gas containing oxygen ($O_2$) and water vapor, and a gas containing ozone ($O_3$) and water vapor. In addition, the oxidizing gas containing water vapor may be a mixed gas thereof, and the mixed gas diluted with an inert gas. In other words, the oxidizing gas containing water vapor may be a mixed gas of water vapor and oxygen, a mixed gas of water vapor and an inert gas, a mixed gas of water vapor, oxygen, and an inert gas. In addition, air may be used as the mixed gas of oxygen and an inert gas.

In the present invention, examples of the gas containing titanium tetrachloride vapor include a mixed gas of titanium tetrachloride vapor and an inert gas, a mixed gas of titanium tetrachloride vapor and oxygen, and a mixed gas of titanium tetrachloride vapor, oxygen, and an inert gas. In addition, air may be used as the mixed gas of oxygen and an inert gas.

In the present invention, it is important not to make the gas containing titanium tetrachloride vapor produce titanium oxide in a preheating process.

However, when the gas containing titanium tetrachloride vapor is a mixed gas of only titanium tetrachloride vapor and an inert gas, and the mixed gas is introduced into the region heated to 800° C. or greater, the degree of mixture between the titanium tetrachloride vapor and oxygen is insufficient. Thereby, it is difficult to produce selectively decahedral titanium oxide particles.

Therefore, the gas containing titanium tetrachloride vapor is preferably the mixed gas of titanium tetrachloride vapor and oxygen, or a mixed gas of titanium tetrachloride vapor, oxygen, and an inert gas, in the present invention.

In the present invention, when the gas containing titanium tetrachloride vapor and the oxidizing gas containing water vapor are contacted, they are immediately reacted. Therefore, in order to produce selectively the decahedral titanium oxide particles, the temperature in contacting is important. Specifically, it is necessary that the gas containing titanium tetrachloride vapor and the oxidizing gas containing water vapor be preheated to 500° C. or greater, respectively, before contact. When the preheating temperature is less than 500° C., it is impossible to produce sufficient decahedral titanium oxide particles when the gases are contacted.

In the present invention, after the gas containing titanium tetrachloride vapor and the oxidizing gas containing water vapor are contacted, it is necessary for the gasses to be introduced into the region heated to 800° C. or greater. After contacting, it is preferable that these gases be introduced immediately into the region heated to 800° C. or greater. In addition, the residence time of the gasses in the region heated to 800° C. or greater is preferably 300 msec. or less, and more preferably 100 msec. or less. When the residence time exceeds 300 msec., the particle diameter of the produced titanium oxide particles increases, and rutile-type crystals also increases. That is, it is difficult to produce sufficient decahedral titanium oxide particles.

In the present invention, the concentration of titanium tetrachloride in the gas containing titanium tetrachloride vapor is preferably 3 to 40% by volume. When the concentration of the titanium tetrachloride is less than 3% by volume, the ratio of the produced decahedral titanium oxide particles decreases. In contrast, when it exceeds 40% by volume, the particle diameter of the obtained titanium oxide particles increases. Therefore, the concentration of the titanium tetrachloride in the gas containing titanium tetrachloride vapor is preferably 3 to 40% by volume, and more preferably 15 to 30% by volume.

In the present invention, a molar ratio (moles [mol] of oxygen ($O_2$ unit conversion)/moles [mol] of titanium tetrachloride) in the gas containing titanium tetrachloride vapor is preferably in a range of from 0.1 to 7.

When the molar ratio is less than 0.1, the ratio of the produced decahedral titanium oxide particles decreases. In contrast, when it exceeds 7, the particle diameter of the obtained titanium oxide particles increases. Therefore, the molar ratio (moles [mol] of oxygen ($O_2$ unit conversion)/ moles [mol] of titanium tetrachloride) in the gas containing titanium tetrachloride vapor is preferably in a range of from 0.1 to 7, and more preferably in a range of from 2 to 5.

In the present invention, the concentration of the water vapor in the oxidizing gas containing water vapor is preferably in a range of from 10 to 80% by volume.

When the concentration of the water vapor is less than 10% by volume, the particle diameter of the obtained titanium oxide particles increases. In contrast, when it exceeds 80% by volume, the ratio of the produced decahedral titanium oxide particles decreases. Therefore, the concentration of the water vapor in the oxidizing gas containing water vapor is preferably in a range of from 10 to 80% by volume, and more preferably in a range of from 15 to 40% by volume.

In the present invention, the molar ratio (moles [mol] of oxygen ($O_2$ unit conversion)/moles [mol] of water vapor) in the oxidizing gas containing water vapor is preferably in a range of from 0.1 to 5.

When the molar ratio is less than 0.1, the ratio of the produced decahedral titanium oxide particles decreases. In contrast, when it exceeds 5, the ratio of the produced decahedral titanium oxide particles also decreases. Therefore, the molar ratio (moles [mol] of oxygen ($O_2$ unit conversion)/moles [mol] of water vapor) in the oxidizing gas containing water vapor is preferably in a range of from 0.1 to 5, and more preferably 0.5 to 3.

In the present invention, the volume ratio of the oxidizing gas containing water vapor relative to the gas containing titanium tetrachloride vapor is in a range of from 0.5 to 5 times.

When the volume ratio is less than 0.5 times, the particle diameter of the obtained titanium oxide particles increases. In contrast, when it exceeds 5 times, the ratio of the produced decahedral titanium oxide particles decreases. Therefore, the volume ratio of the oxidizing gas containing water vapor relative to the gas containing titanium tetrachloride vapor is preferably in a range of from 0.5 to 5 times, and more preferably in a range of from 0.8 to 2 times.

In the present invention, the composition (a volume ratio of titanium tetrachloride:oxygen:water vapor) in a mixed gas of the gas containing titanium tetrachloride vapor and the oxidizing gas containing water vapor is preferably in a range of 1:0.5 to 13:0.3 to 5, and more preferably in a range of 1:1 to 6:0.5 to 3.

When the volume ratio is outside the range, it is difficult to produce selectively the decahedral titanium oxide particles. The reasons for the difficulty have not been determined yet. However, it can be presumed that the concentration, and the rate in hydrolysis of the titanium tetrachloride by water vapor, the reaction rate of the non-reacted titanium tetrachloride and oxygen after the hydrolysis, the residence time in the reaction zone, etc. affect the ease of selective production of the decahedral titanium oxide particles.

As explained above, the method for producing titanium oxide particles according to the present invention uses a method in which in a case of oxidizing titanium tetrachloride in vapor at high temperatures, it is rapidly heated and cooled, in combination with a method in which water vapor is used as an oxidizing gas. It is possible to produce selectively and efficiently the decahedral titanium oxide particles having a particle diameter in a range of from 1 nm to 100 nm. In addition, the produced fine titanium oxide particles are used suitably as a photocatalyst material. Therefore, it is possible to produce industrially the decahedral titanium oxide particles which are preferably used as a photocatalyst material, according to the present invention.

Next, one embodiment of a reaction apparatus for carrying out the method for producing titanium oxide particles according to the present invention is shown in FIG. 1.

As shown in FIG. 1, the reaction apparatus has a reaction tube 1 for reacting the gas containing titanium tetrachloride vapor with the oxidizing gas containing water vapor, an infrared gold image furnace 2 for locally heating a part (a heated portion 1a) of the reaction tube 1, and a product material recovery portion 3 for recovering the titanium oxide particles produced in the reaction tube 1.

Specifically, a cylindrical tube made of quartz can be used as the reaction tube 1. The reaction tube 1 has an introduction tube 4 for introducing the oxidizing gas containing water vapor, which is connected to the surround surface at near one end (upstream side) of the reaction tube 1, and another introduction tube 5 for introducing the gas containing titanium tetrachloride vapor, which is inserted into the reaction tube 1 from upstream side of the reaction tube 1.

At the upstream side of the introduction tube 4, an introduction inlet 4a for introducing water, oxygen ($O_2$), and nitrogen, for example, and a vaporizer 6 for vaporizing water, which is introduced from the introduction inlet 4a, are provided. The oxidizing gas containing water vapor (the oxidizing gas contains water vapor, oxygen ($O_2$), and nitrogen in this embodiment), which is introduced from the introduction inlet 4a, changes to a mixed gas of water vapor, oxygen ($O_2$), and nitrogen by passing through the vaporizer 6, and then the mixed gas is introduced into the reaction tube 1 from the introduction tube 4.

At the upstream side of the introduction tube 5, an introduction inlet 5a for introducing titanium tetrachloride ($TiCl_4$), an introduction inlet 5b for introducing oxygen ($O_2$), and a vaporizer 7 for vaporizing titanium tetrachloride ($TiCl_4$), which is introduced from the introduction inlet 5a, are provided. The gas containing titanium tetrachloride vapor (the gas contains titanium tetrachloride vapor and oxygen ($O_2$) in this embodiment) changes to a mixed gas of titanium tetrachloride vapor, and oxygen ($O_2$) by passing through the vaporizer 7, and then the mixed gas is introduced into the reaction tube 1 from the introduction tube 5.

As explained above, the introduction tube 5 is inserted into the reaction tube 1 from the one end (upstream side) of the reaction tube 1. An infrared light is irradiated from an infrared gold image furnace 2 toward the end of the introduction tube 5. A baffle 8 is inserted from the other end (downstream side) of the reaction tube 1. The baffle 8 introduces the gases introduced into the reaction tube 1 toward the outer circumference in the reaction tube 1 which is heated to high temperatures. For example, the baffle 8 is an instrument obtained by blocking an end of a quartz tube so as to sharpen. The sharpened end of the baffle 8 is positioned so as to face the end of the introduction tube 5 in the reaction tube 1. The end of the introduction tube 5 and the sharpened end of the baffle 8 located in the heated portion 1a in the reaction tube 1. Moreover, the baffle 8 contributes to shortening the residence time of gas in a reaction zone B which is explained below.

A platinum plate is wound around the reaction tube 1 at the heated portion 1a. Since the heated portion 1a can be rapidly heated or cooled by the combination between the platinum plate and the infrared gold image furnace 2. Specifically, since the platinum plate absorbs an infrared light irradiated from the infrared gold image furnace 2 and produces heat, a portion, which contacts the platinum plate, is locally heated. Thereby, it is possible that the heated portion 1a is heated to about 1,200° C. The temperature at the heated portion 1a can be arbitrarily adjusted using a temperature-controller (not shown in FIG. 1) by controlling the irradiation of an infrared light from the infrared gold image furnace 2.

The heated portion 1a, which is wound with the platinum plate, includes a portion (a preheating zone A) from the end of the heated portion 1a at the upstream side to the end of the introduction tube 5, at which the gas containing titanium tetrachloride vapor and the oxidizing gas containing water vapor are preheated. In addition, the heated portion 1a further includes a portion (a reaction zone B) at downstream side of the heated portion 1a from the end of the introduction tube 5, specifically, at a portion from the end of the introduction tube 5 to the end of the heated portion 1a at the downstream side, at which the titanium tetrachloride in vapor is oxidized at high temperatures.

A product material recovery portion 3 may be a bag filter, etc. The product material recover portion 3 recovers titanium oxide particles, which are produced in the reaction tube 1, via the outlet tube 9 connected to the other end (downstream side) of the reaction tube 1. In the product material recovery portion 3, it is preferable to vacuum from the downstream of the outlet tube 9 using a pump (not shown in FIG. 1) so as not to occlude the outlet tube 9.

In the reaction apparatus, the oxidizing gas containing water vapor, which is introduced into the reaction tube 1 from the introduction tube 4, and the gas containing titanium tetrachloride vapor, which passes through the introduction tube 5, are preheated to 500° C. or greater at the preheating zone A. After that, they are mixed and heated to 800° C. or greater at the reaction zone B. Shortly after the gas containing titanium tetrachloride vapor and the oxidizing gas containing water vapor are contacted in the reaction zone B, they are reacted. The obtained reaction gas passes through the reaction zone B at the residence time of 300 msec. or less. Then the gas, which is passed through the reaction zone B, is immediately cooled, and introduced into the product material recovery portion 3.

When the reaction apparatus is used, a method, in which during oxidization of the titanium tetrachloride in vapor at high temperatures, it is rapidly heated and rapidly cooled, and a method, in which water vapor is used as an oxidizing gas, can be used in combination. Therefore, it is possible to produce selectively and efficiently the titanium oxide particles having a decahedral box-shape and a particle diameter in a range of from 1 nm to 100 nm under the above-mentioned conditions.

EXAMPLES

The effects obtained by the present invention will be cleared by the following examples. However, the present invention is not limited to the following example. In addition, the constitution of the present invention can be changed as far as the change of the constitution is within the scope of the present invention.

Example 1

In Example 1, titanium oxide power was produced under the following conditions using the reaction apparatus shown in FIG. 1.

Specifically, a platinum plate having a width of 10 cm was wound (this portion is the heated portion 1a) around the reaction tube 1. The heated portion 1a was irradiated with an infrared light from the infrared gold image furnace 2 while controlling the infrared gold image furnace 2 by a temperature controller so that the surface temperature of the platinum plate be 1,200° C.

A quartz tube having an inner diameter of 21.4 mm was used as the reaction tube 1. The baffle 8 was produced by blocking the end of a quartz tube having an outer diameter of 12.7 mm so as to sharpen at about 30°. The cross sectional area at the heated portion 1a is 2.3 cm$^2$.

The end of the introduction tube 5 for introducing the gas containing titanium tetrachloride vapor was positioned 6 cm apart from the upstream end of the heated portion 1a which is wound with the platinum plate (since the width of the platinum plate is 10 cm, the width of the heated portion 1a is also 10 cm). The space from the end of the introduction tube 5 to the upstream end of the heated portion 1a was used as the preheating zone A. The space (width: 4 cm) from the end of the introduction tube 5 to the downstream end of the heated portion 1a was used the reaction zone B at high temperatures.

A mixed gas of water vapor, oxygen ($O_2$), and nitrogen was used as the oxidizing gas containing water vapor. The mixed gas of water, oxygen, and nitrogen was introduced into the reaction apparatus from the introduction inlet 4a. After passing through the vaporizer 6, the gases were introduced into the reaction tube 1 from the end of the introduction tube 5 as the oxidizing gas containing water vapor. The mixed gas after passing through the vaporizer 6 had the composition of water vapor:oxygen:nitrogen=20:20:60 (in volume). The mixed gas was introduced at flow rate of 600 NmL/min.

The mixed gas of titanium tetrachloride vapor and oxygen ($O_2$) was used as the gas containing titanium tetrachloride vapor. $TiCl_4$ was introduced from the introduction inlet 5a, and oxygen ($O_2$) was introduced from the introduction inlet 5b, into the reaction apparatus. After passing through the vaporizer 7, they were introduced into the reaction tube 1 from the end of the introduction tube 5. The mixed gas after passing through the vaporizer 7 had the composition of titanium tetrachloride:oxygen=20:80. The mixed gas was introduced at flow rate of 600 NmL/min.

The total gasses to be reacted were adjusted so as to have the composition of titanium tetrachloride:oxygen:water vapor=1:5:1 (in volume). The residence time of the reaction gasses in the reaction zone B was adjusted to about 50 msec.

Comparative Example 1

Titanium oxide powder was produced in a manner identical to that of Example 1, except that an oxidizing gas not containing water vapor was used instead of the oxidizing gas containing water vapor, that is, a mixed gas of oxygen and nitrogen was introduced from the introduction inlet 4a.

Comparative Example 2

Titanium oxide powder was produced in a manner identical to that of Example 1, except that an oxidizing gas containing water vapor was not introduced, and only mixed gas (the concentration of titanium tetrachloride: 6%) of titanium tetrachloride vapor, and oxygen ($O_2$) was slowly introduced from the introduction tube 5 (300 NmL/min.).

After that, the titanium oxide powder obtained in Example 1, and Comparative Examples 1 and 2 were observed using a scanning electronic microscope. The production conditions and observation results in Example 1, and Comparative Examples 1 and 2 are summarized in Table 1. Moreover, the titanium oxide powder was arbitrary sampled from three points, put into a sample chamber in the scanning electronic microscope, and observed at five or more visual fields.

TABLE 1

| | Gas containing titanium tetrachloride vapor Upper: flow rate Lower: composition | Oxidizing gas containing water vapor Upper: flow rate Lower: composition | Composition of total gasses to be reacted (in volume) | Length of Preheating zone and Reaction zone | Residence time in Reaction zone | Results |
|---|---|---|---|---|---|---|
| Example 1 | 600 NmL/min. $TiCl_4:O_2 = 20:80$ | 600 NmL/min. $H_2O:O_2:N_2 = 20:20:60$ | $TiCl_4:O_2:H_2O = 1:5:1$ | Preheating zone: 6 cm Reaction zone: 4 cm | 50 msec. | Decahedral box-shape Particle diameter: 50 to 90 nm |
| Comparative Example 1 | 600 NmL/min. $TiCl_4:O_2 = 20:80$ | 600 NmL/min. $H_2O:O_2:N_2 = 0:40:0$ | $TiCl_4:O_2:H_2O = 1:6:0$ | Preheating zone: 6 cm Reaction zone: 4 cm | 50 msec. | Non decahedral box-shape Particle diameter: 30 to 200 nm |
| Comparative Example 2 | 300 NmL/min. $TiCl_4\ O_2:N_2 = 6:84:10$ | None | $TiCl_4:O_2:H_2O = 1:14:0$ | Only Reaction zone: 4 cm | 200 msec. | Decahedral box-shape Particle diameter: 70 to 150 nm |

As shown in Table 1, the titanium oxide powder obtained in Example 1 is the decahedral titanium oxide particles having a particle diameter in a range of from 50 to 90 nm.

In contrast, the titanium oxide powder obtained in Comparative Example 1 is not decahedral titanium oxide particles, and has a broad distribution of a particle diameter, such as a range of from 30 to 200 nm.

In addition, the titanium oxide powder obtained in Comparative Example 2 is the decahedral titanium oxide particles, but the titanium oxide powder has a broad distribution of a particle diameter, such as a range of from 70 to 150 nm. The titanium oxide powder obtained in Comparative Example 2 includes titanium oxide particles having a large particle diameter.

As explained above, it is possible to produce selectively and efficiently the titanium oxide particles having a decahedral box-shape and a particle diameter in a range of from 1 nm to 100 nm, according to the present invention.

INDUSTRIAL APPLICABILITY

According to the method for producing titanium oxide particles, it is possible to produce selectively and efficiently the decahedral titanium oxide particles having a particle diameter in a range of from 1 nm to 100 nm. In addition, the produced fine titanium oxide particles are used suitably as a photocatalyst material. Therefore, it is possible to produce industrially the decahedral titanium oxide particles which are preferably used as a photocatalyst material, according to the present invention.

The invention claimed is:

1. A method for producing titanium oxide particles having a decahedral box-shape, and a particle diameter in a range of from 1 nm to 100 nm, by contacting a gas containing titanium tetrachloride vapor and an oxidizing gas containing water vapor, which produces the decahedral titanium oxide particles when the produced titanium oxide particles are randomly collected, and observed using an electronic microscope, at least 80% of titanium oxide particles, which can be observed in an arbitrary visual field, have the particle diameter of from 1 nm to 100 nm, wherein the method comprises a step of preheating the gas containing titanium tetrachloride and the oxidizing gas containing water vapor to 500° C. or greater followed by mixing the gas containing titanium tetrachloride vapor and the oxidizing gas containing water vapor to form a mixed gas, and introducing the mixed gas into a region which is heated to 800° C. or greater;
the gas containing titanium tetrachloride vapor contains tetrachloride vapor and oxygen,
the oxidizing gas containing water vapor is a mixed gas of water vapor and oxygen; and
a molar ratio of $O_2$/titanium tetrachloride in the gas containing titanium tetrachloride vapor is in a range of from 0.1 to 7.

2. A method for producing titanium oxide particles according to claim 1, wherein a residence time of the mixed gas in the region which is heated to 800° C. or greater is 300 msec. or less.

3. A method for producing titanium oxide particles according to claim 2, wherein the residence time is 100 msec. or less.

4. A method for producing titanium oxide particles according to claim 1, wherein a concentration of the titanium tetrachloride in the gas containing titanium tetrachloride vapor is in a range of from 3 to 40% by volume.

5. A method for producing titanium oxide particles according to claim 1, wherein a concentration of the water vapor in the oxidizing gas containing water vapor is in a range of from 10 to 80% by volume.

6. A method for producing titanium oxide particles according to claim 1, wherein a molar ratio of oxygen/water vapor in the oxidizing gas containing water vapor is in a range of from 0.1 to 5, wherein the amount of oxygen is calculated in terms of $O_2$.

7. A method for producing titanium oxide particles according to claim 1, wherein a volume ratio of the oxidizing gas containing water vapor relative to the gas containing titanium tetrachloride vapor is in a range of from 0.5 to 5 times.

8. A method for producing titanium oxide particles according to claim 1, wherein a volume ratio of titanium tetrachloride:oxygen:water vapor of the mixed gas of the gas containing titanium tetrachloride vapor and the oxidizing gas containing water vapor is 1:0.5 to 13:0.3 to 5.

9. A method for producing titanium oxide particles according to claim 8, wherein a volume ratio of titanium tetrachloride:oxygen:water vapor in a mixed gas of the gas containing titanium tetrachloride vapor and the oxidizing gas containing water vapor is 1:1 to 6:0.3 to 3.

* * * * *